United States Patent
Shotmeyer et al.

(10) Patent No.: US 11,841,138 B2
(45) Date of Patent: Dec. 12, 2023

(54) FUEL TANK MONITORING SYSTEMS AND METHODS

(71) Applicant: Fivovos, LLC, Franklin Lakes, NJ (US)

(72) Inventors: Charles Jacob Shotmeyer, Boca Raton, FL (US); Jon Thomas Buonaccorsi, Barrington, RI (US); Christopher Louis Corrado, East Providence, RI (US); Edward Norman McGrath, III, Warrington, PA (US)

(73) Assignee: Fivovos, LLC, Franklin Lakes, NJ (US)

( * ) Notice: Subject to any disclaimer, the term of this patent is extended or adjusted under 35 U.S.C. 154(b) by 375 days.

(21) Appl. No.: 17/187,952

(22) Filed: Mar. 1, 2021

(65) Prior Publication Data
US 2022/0277260 A1    Sep. 1, 2022

(51) Int. Cl.
*F23K 5/14* (2006.01)
(52) U.S. Cl.
CPC .................................. *F23K 5/147* (2013.01)
(58) Field of Classification Search
CPC ............... F23K 5/147; F02D 19/0628; G06Q 10/08355; G06Q 10/0832; G01F 23/00; G01N 2035/1025; G01N 2291/02836
See application file for complete search history.

(56) References Cited

U.S. PATENT DOCUMENTS

| | | |
|---|---|---|
| 5,708,424 A | 1/1998 | Orlando et al. |
| 5,975,131 A | 11/1999 | Theisen et al. |
| 6,668,665 B2 | 12/2003 | Schimnowski et al. |
| 7,197,407 B2 | 3/2007 | Schimnowski et al. |
| 7,295,919 B2 | 11/2007 | Humphrey |
| 7,304,588 B2 | 12/2007 | Ingalsbe et al. |
| 7,512,488 B2 | 3/2009 | Humphrey |
| 7,628,378 B2 | 12/2009 | Adams et al. |
| 7,937,215 B2 | 5/2011 | Humphrey |
| 7,937,216 B2 | 5/2011 | Humphrey |
| 8,150,615 B2 | 4/2012 | Humphrey |
| 8,340,909 B2 | 12/2012 | Humphrey |
| 8,504,294 B2 | 8/2013 | Humphrey |
| 8,798,913 B2 | 8/2014 | Humphrey |
| 9,874,470 B2 | 1/2018 | McBride et al. |
| 9,911,095 B2 | 3/2018 | Mashburn et al. |
| 10,101,191 B2 | 10/2018 | McBride et al. |
| 10,197,428 B2 | 2/2019 | McBride et al. |
| 10,267,665 B2 | 4/2019 | McBride et al. |
| 10,528,910 B2 | 1/2020 | Mashburn et al. |

(Continued)

*Primary Examiner* — Omeed Alizada
(74) *Attorney, Agent, or Firm* — McCarter & English, LLP (57) ABSTRACT

Systems and methods for remotely monitoring the amount of fuel in one or more fuel tanks are disclosed. A fuel monitoring device includes a sensor configured to monitor the operation of a valve coupled to an output of a fuel tank and a network and communication system configured to receive data from the sensor related to the operation of the valve and establish communication with one or more remote systems via a communications network. The fuel monitoring device communicates the data related to the operation of the sensor to a remote server system via the communications network. Based on the data received from the fuel monitoring device and one or more remote systems, the remote server system can determine the amount of fuel remaining in the tank, and can predict when the tank will require additional fuel.

21 Claims, 8 Drawing Sheets

(56) References Cited

U.S. PATENT DOCUMENTS

2009/0243863 A1 10/2009 Lease
2019/0242242 A1 8/2019 Tian et al.
2020/0039660 A1* 2/2020 Mills .................... B67D 7/3236
2021/0256837 A1* 8/2021 DeQuarto .............. G08C 17/02

* cited by examiner

FUEL TANK MONITORING SYSTEMS AND METHODS

BACKGROUND

Technical Field

The present disclosure relates generally to the field of fuel tank monitoring systems and methods, and more specifically, to a monitoring system external to a fuel tank, and methods for remotely monitoring and acquiring data about fuel consumption.

Related Art

In the commercial and residential fuel (e.g., oil, propane, natural gas, etc.) delivery field, fuel levels in tanks are often estimated or internal tank monitoring systems are used. However, estimates can be inaccurate and internal tank monitoring systems can be expensive and subject to failure. Some monitoring systems include sensors (e.g., float sensors) positioned within a fuel tank that collect data on the level of the fuel and relay said data to a monitoring device located near the tank. However, this approach can require a specialized fuel tank, or retrofitting of a fuel tank, with an appropriate float sensor and the means for communicating the data to the exterior of the fuel tank. Other systems rely on flow sensors located outside of the fuel tank, positioned in-line with an output pipe of the fuel tank to measure the flow of fuel out of the storage tank. However, this approach also requires retrofitting an existing fuel system to install the sensor in-line with an output of the fuel tank and the mechanical nature of flow sensors render them prone to malfunctions.

SUMMARY

The present disclosure relates to a fuel monitoring system and methods that provide for the monitoring and measuring of characteristics of fuel tanks and related fuel distribution systems.

The system can include a fuel monitoring device having a sensor configured to monitor a valve coupled to an output of a fuel tank, and a communication system for communicating with one or more communication networks. The fuel tank valve can be a solenoid valve and the sensor can be a Hall-effect sensor, positioned proximate the valve, that senses a magnetic field generated by the solenoid valve when it is actuated. The system can calculate the amount of fuel that exits through the valve, based on the length of time the valve is actuated, and can determine the amount of fuel remaining in the tank. Data from the fuel monitoring device can be transmitted to and/or be accessible by one or more remote computer systems by way of communication network.

The fuel monitoring devices at customer locations, a remote analytics server, a fuel provider system, one or more mobile devices, and one or more fuel delivery vehicles can all be in communication via a network (for example, the Internet). The analytics server can include hardware and software components for managing a plurality of fuel monitoring devices. For example, the server can include a processor and a memory for executing system code, a device manager for transmitting information and notifications to one or more of the mobile devices, a fuel analytics engine for determining the amount of fuel remaining in a given fuel tank and/or predicting when a given fuel tank will require refueling, a delivery optimization engine for generating efficient delivery schedules and routes for one or more delivery vehicles, and an inventory engine for maintaining adequate fuel supply levels at a fuel provider location. The server can also include a customer systems database for storing information related to the configuration of the fuel tanks, associated valves, and fuel service or delivery history and a sensor database for storing information received from the fuel monitoring device.

Other features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

The present disclosure relates to systems and methods for monitoring and measuring fuel levels in a fuel tank, described in detail below in connection with FIGS. 1-8.

Figure 1:
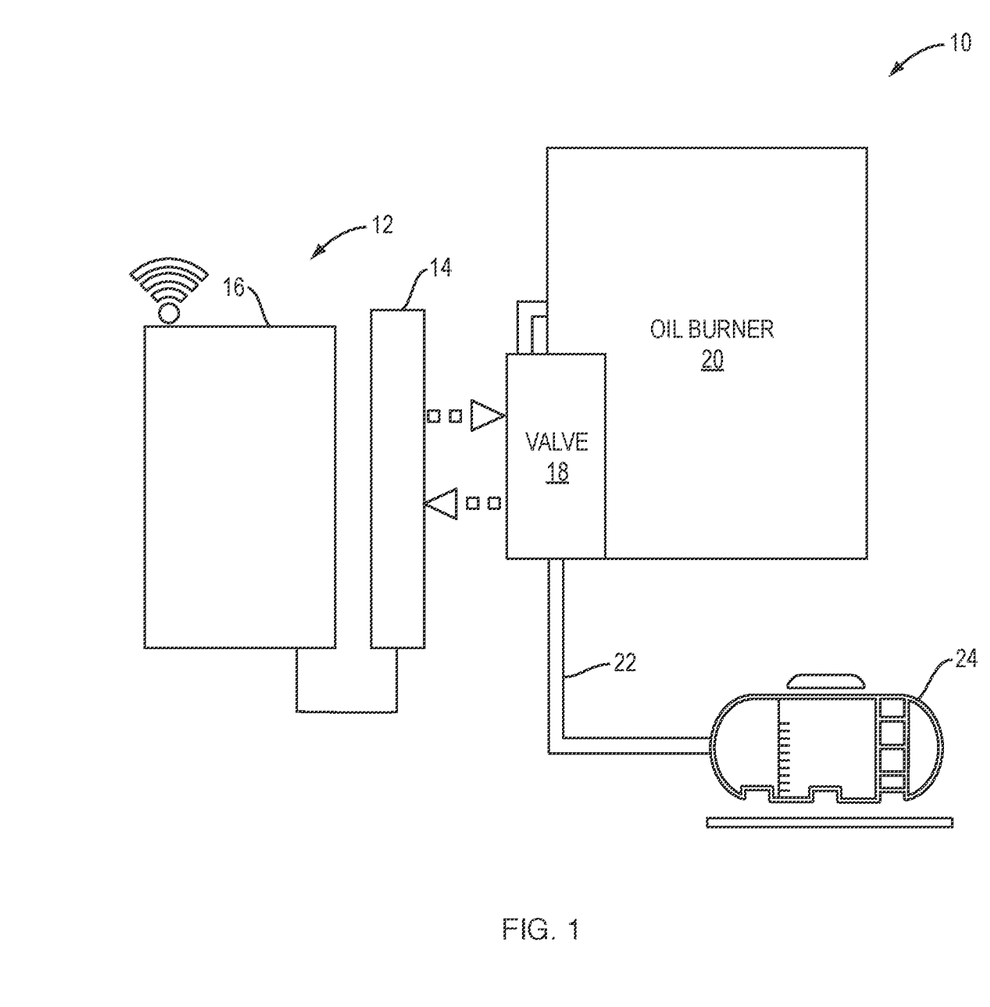
FIG. 1 is a diagram illustrating a fuel monitoring device of the present disclosure.

FIG. 1 is a diagram illustrating a fuel monitoring system 10 of the present disclosure. The fuel monitoring system 10 can include a fuel monitoring device 12 having a sensor 14 and a communication system 16 for communicating with one or more communication networks (e.g., network 90 described in connection with FIG. 3). The sensor 14 can be positioned proximate to fuel valve 18, which controls the amount of fuel that is provided to a burner 20, or other fuel-consuming device, from a fuel storage tank 24. For example, the valve 18 can be engaged with a supply pipe 22 that provides fuel to the burner 20 from the fuel tank 24.

The fuel valve 18 can be a solenoid valve of a fuel pump (not shown) and the sensor 14 can be a Hall-effect sensor. The Hall-effect sensor senses a magnetic field that is generated by a solenoid valve when the valve is on. The fuel valve 18 can be an existing solenoid valve already installed in a fuel system (e.g., coupled to, or integrated within, the burner 20). The Hall sensor 14 can be positioned adjacent to the solenoid valve 18, without requiring modification to an existing fuel system, to monitor the operational status (e.g., on or off) of the fuel valve 18, and the system 10 can determine when fuel is being pumped to the burner 20. Additionally, the system 10 can calculate the amount of fuel that that is being consumed by the burner 20, based on the flow rate of the valve, and determine the amount of fuel remaining in the tank 24. Information related to the fuel consumption and/or fuel supply level can be transmitted to and/or be accessible by one or more remote computer systems by way of the communication system 16. Accordingly, the system 10 can provide for remote review of fuel levels by fuel customers and suppliers. The system 10 can efficiently schedule deliveries, thereby preventing customers from running out of fuel, can detect leaks, and can generate extensive amounts of data for analysis if widely adopted.

Figure 2:
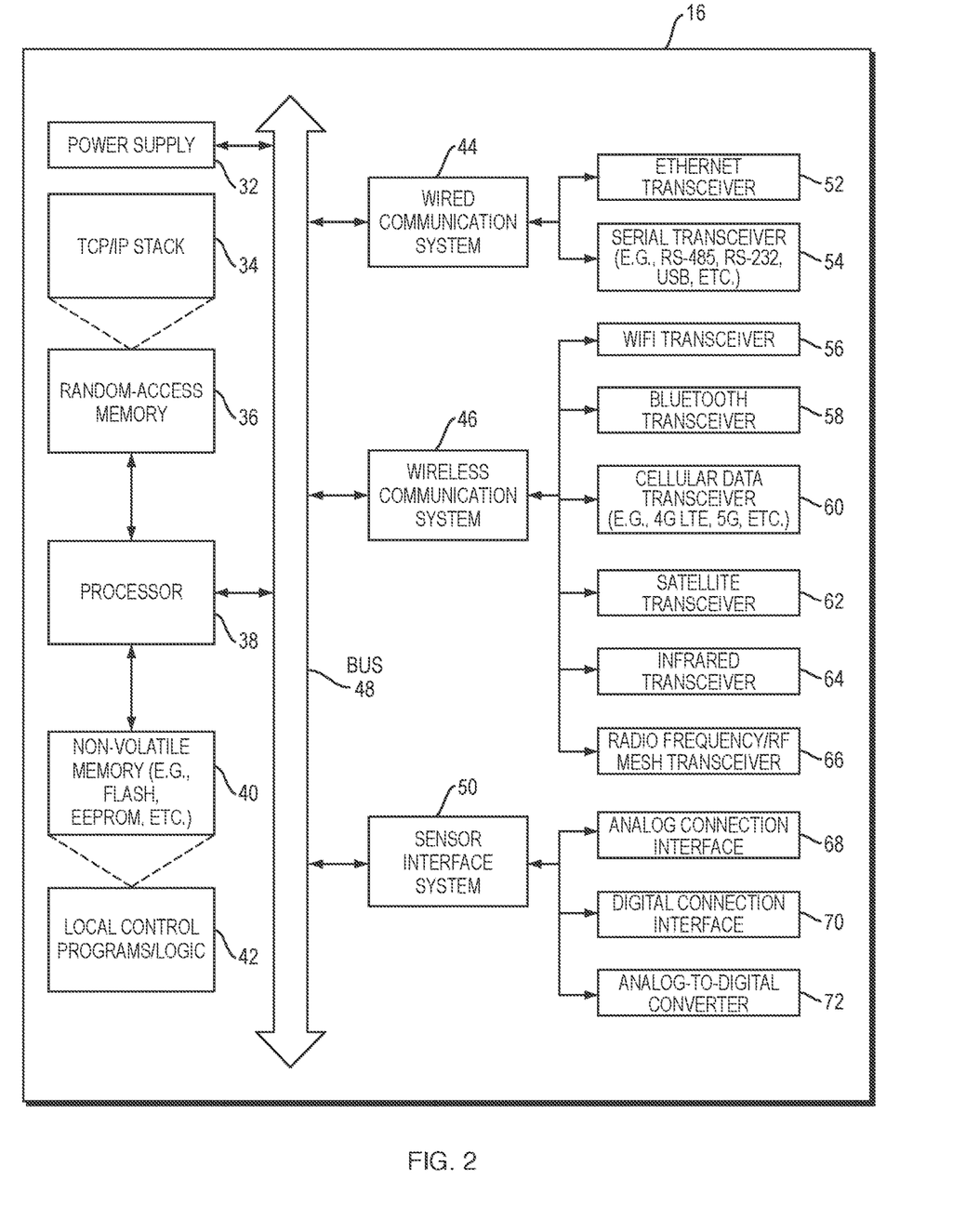
FIG. 2 is a diagram illustrating a communication system for use with the fuel monitoring device of FIG. 1.

FIG. 2 is a block diagram illustrating components of the communication system 16 of the monitoring device 12 of FIG. 1 in greater detail. According to some embodiments of the present disclosure, the communication system 16 and the sensor 14 can be enclosed within a single housing. Alternatively, the communication system 16 can be enclosed within a housing and the sensor 14 can be positioned remotely therefrom and can communicate with the communication system 16 via one or more of the communication protocols (e.g., wired or wireless) disclosed herein.

A power supply 32 provides the fuel monitoring device 12 with power. The power supply 32 can receive power from any power source such as one or more of an electrical grid, a battery or a rechargeable battery, such as a lithium ion battery. For example, the power supply 32 can be coupled to a standard 120/240 v AC wall outlet via a power conductor to provide power to the fuel monitoring device 12 and can also charge an internal rechargeable battery (not shown). In the event of an electrical grid power failure, the monitoring device 12 can draw power from the battery until power is restored. The power supply 32 could have ON/OFF capability such that the communication system 16 could be powered ON when necessary and turned OFF when not in use to prolong battery life.

A processor 38 provides local processing capability for the communication system 16. The processor 38 is in communication with a random access memory 36, and one or more non-volatile memories 40. The non-volatile memory 40 could store one or more local programs 42 for providing local control of the communication system 16. The control programs 42 can be, for example, polling schedules for the sensor 14 and schedules for uploading the sensor data to a remote server, such as those described in connection with FIGS. 4-8. A TCP/IP stack 34 is provided for allowing the communication system 16 to obtain an Internet protocol address, and to provide Internet connectivity for the fuel monitoring device 12. The processor 38 could communicate with a wired communication system 44, a wireless communication system 46 and/or a sensor interface system 50 by way of a bus 48.

As shown, the communication system 16 can provide for a wide variety of wired and wireless connections to the fuel monitoring device 12. For example, the communication system 44 can communicate with an Ethernet transceiver 52 and a serial transceiver 54. The serial transceiver 54 could support one or more suitable serial communication protocols, such as RS-485, RS-232, USB, etc. The wireless communication system 46 could include a Wi-Fi transceiver 56, a Bluetooth (or Bluetooth LE) transceiver 58, a cellular data transceiver 60, a satellite transceiver 62, an infrared transceiver 64, and a radiofrequency/RF mesh transceiver 66. The cellular data transceiver 60 could support one or more cellular data communications protocols, such as 4G, LTE, 5G, etc. The radiofrequency/RF mesh transceiver 66 could support one or more RF mesh network protocols, such as ZWave, Zigbee, Thread, Weave, etc. Accordingly, the fuel monitoring device 12 could connect to a remote server or "cloud" platform (e.g., server 84 shown in FIG. 3) via the communication system 16 to allow for remote and/or web-based control.

The sensor interface system 50 could include an analog connection interface 68, a digital connection interface 70, and one or more analog-to-digital converters 72. The sensor interface system 50 allows the communication system 16 to obtain information from the sensor 14, as well as a wide variety of other sensor types that can be associated with the fuel monitoring system 10. Other types of sensors can be used with the fuel monitoring device 12. The wired communication system 44 and/or the wireless communication system 46 allow the communication system 16 to connect to a network (e.g., the Internet) to allow the fuel monitoring device 12 to transmit data from the sensor 14 to one or more remote computer systems, as well as to be remotely controlled by such systems.

Figure 3:
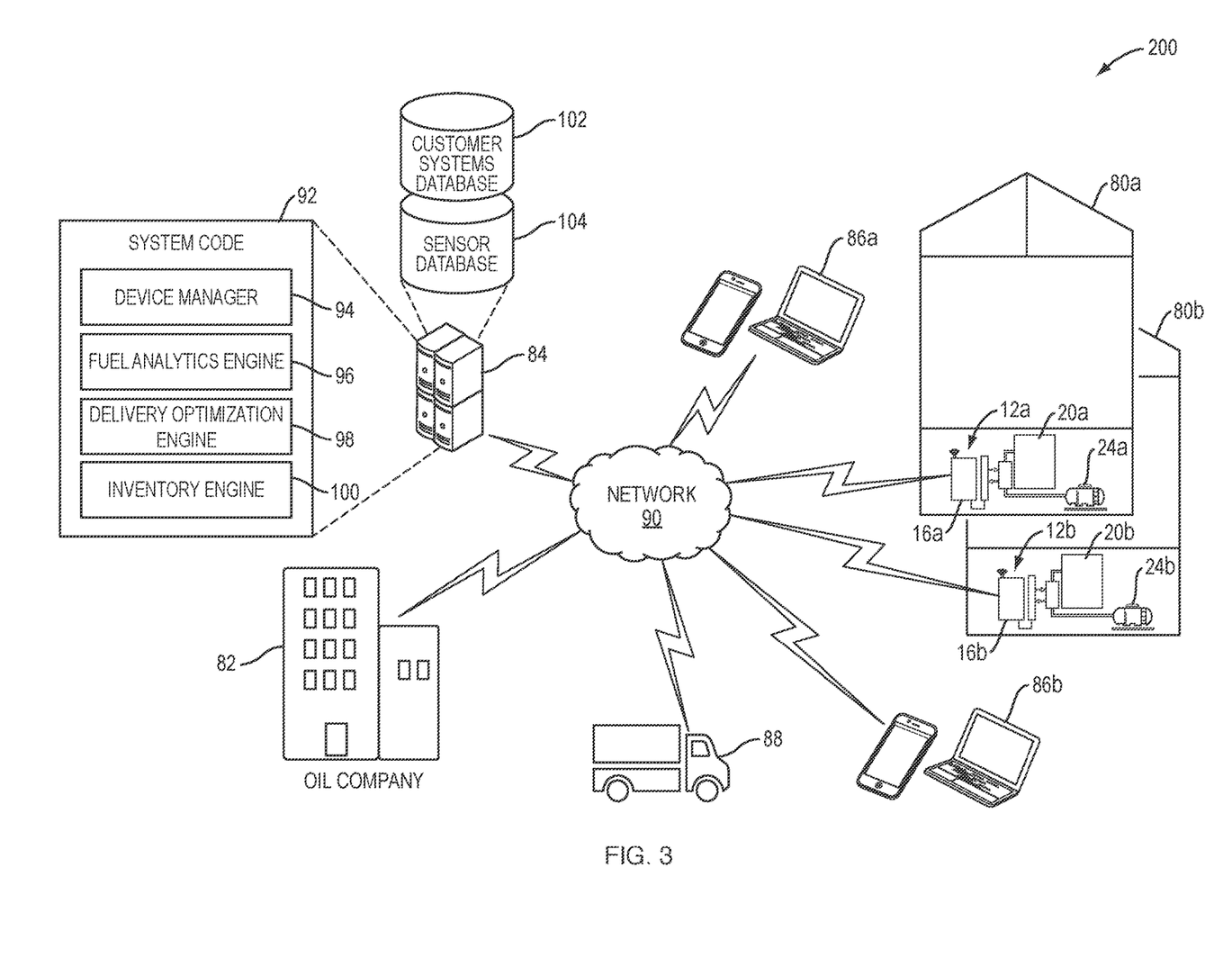
FIG. 3 is a diagram illustrating a fuel monitoring system of the present disclosure.

FIG. 3 is a diagram illustrating an exemplary fuel monitoring system 200 of the present disclosure. As shown, one or more customer locations 80*a* and 80*b* can each be provided with respective fuel monitoring devices 12*a* and 12*b* for monitoring the amount of fuel consumed from fuel tanks 24*a* and 24*b* by burners 20*a* and 20*b*. Additionally, communication systems 16*a* and 16*b* of the fuel monitoring devices 12*a* and 12*b*, a fuel provider 82, an analytics server 84, one or more mobile devices 86*a* and 86*b*, and one or more fuel delivery trucks 88 can all be in communication via a network 90 (e.g., the Internet). The analytics server 84 can include hardware and software components for managing a plurality of fuel monitoring devices 12. For example, the server 84 can include a processor and a memory for executing system code 92, including a device manager 94, a fuel analytics engine 96, a delivery optimization engine 98, and an inventory engine 100. The server 84 can also include a customer systems database 102 and a sensor database 104. It should be understood that the server 84 can be any configuration of hardware and software components capable of executing the system code 92 and communication via the network 90. For example, the server 84 can be embodied as a personal desktop computer, a laptop computer, an enterprise server, a cloud computing system, or the like and can be located, for example, at a remote dedicated facility, at a fuel service provider facility (e.g., fuel provider system 82), or other location.

The monitoring devices 12*a* and 12*b* shown in FIG. 3 can each be similar to the fuel monitoring device 12, discussed in connection with FIGS. 1 and 2. Each of the monitoring devices 12*a* and 12*b* can be respectively connected to mobile devices 86*a* and 86*b* (e.g., via a respective Bluetooth™ connection) of a customer, or each of the monitoring devices 12*a* and 12*b* can be similarly connected to a mobile device of a service technician. The mobile devices 86*a* and 86*b* can include, but are not limited to, a smart telephone, a tablet, a wearable (e.g., a smart watch), a personal digital assistant, a laptop and a computer. The remote devices 86*a* and 86*b* can each communicate with the server 84 through the network 90, such as the Internet.

Each of the mobile devices 86*a* and 86*b* can run one or more a client applications that can generate and display a graphic user interface on the mobile devices 86*a* and 86*b* and can be configured to display information related to the fuel system 200, deliver notifications indicative of fuel levels, receive user input, and the like. For example, the client application on each of the mobile devices 86*a* and 86*b* can display the current fuel level in a given fuel tank 24, display the status (e.g., on or off) of a given burner 20, notify a customer (e.g., via push notification, or the like) if the fuel level drops below a predetermined threshold, or notify a customer if a problem condition (e.g., a leak in or between the fuel tank 24, the valve 18, and burner 20) is detected at a customer location 80. The server 84 can determine the information and notifications to be displayed on a given mobile device 86 and the client applications can each display the determined information and notifications via the respective graphic user interfaces displayed on the mobile devices 86*a* and 86*b*.

The mobile devices 86*a* and 86*b* can also be used by a fuel service technician or customer to input information related to the fuel system. For example, a fuel service technician can use a mobile device 86 to input parameters related to a customer's fuel system such as, but not limited to, the capacity of a fuel tank 24, the current fuel level of the fuel tank 24, the volumetric flow rate of fuel (e.g., liters or gallons per second) through a (e.g., solenoid) valve 18 when in the "on" position, and other related parameters. These parameters can then be transmitted from the mobile device 86 to the server 84 via the network 90 and stored in the customer systems database 102 for later retrieval and use by the server 84.

The device manager 94 can communicate with and transmit notifications or other information to one or more devices and systems of system 200 via the network 90. For example, the device manager 94 can transmit notifications to one or more of the mobile devices 86*a* and 86*b* to be displayed on the graphic user interface generated by the client application, including but not limited to, notifications that the oil tanks 24*a* or 24*b* are running low, the system 200 has identified a problem condition (e.g., that a fuel leak has been detected, the burner has been running continuously for a predetermined amount of time, etc.) at customer location 80*a* or 80*b*, a delivery truck 88 is on route to customer location 80*a* or 80*b*, or other information that is useful to a fuel customer. Additionally, the device manager 94 can transmit notifications to the fuel provider system 82, including but not limited to, oil tanks 24*a* or 24*b* are running low, the system 200 has identified a problem condition at customer location 80*a* or 80*b*, a delivery truck 88 has been dispatched to or arrived at a customer location 80, the current location of a delivery truck 88 (e.g., provided by a GPS system (not shown) in communication with the system 200), fuel inventory levels, or other information that is useful to a fuel provider.

The fuel analytics engine 96 is a software component of the system 200 and can determine the amount and/or rate that fuel is being consumed at a customer location 80, can determine the amount of fuel that is remaining in a fuel tank 24, can predict when a fuel tank 24 will run out of fuel, and can detect one or more problem conditions at a customer location 80. For example, the fuel analytics engine 96 can retrieve fuel system parameters (e.g., valve volumetric flow rate, tank capacity, last known fuel level, etc.) related to a customer location 80 from the customer systems database 102 and can retrieve sensor data from the sensor database 104. The Hall-effect sensor 14 can determine the operational status (e.g., on or off) of the solenoid valve 18 and this sensor data, along with time stamp data, can be transmitted to the server 84 and stored in the sensor database 104. The sensor database can also store sensor data and related information (e.g., time, location, identification, configuration, etc.) from one or more additional sensors, such as flow sensors, pressure sensors, temperature sensors, and the like. The fuel analytics engine 96 can determine the amount of fuel that is consumed during a given time period at a customer location 80 by identifying the amount of time that a valve 18 is in the "on" position during said time period (e.g., received from the sensor database 104) and multiplying the time by the volumetric flow rate of the valve 18. This information can be stored in the one or more of the databases 102 and 104 for later retrieval and use by the system 200. Similarly, the analytics engine 96 can determine how much fuel is remaining in a storage tank 24 by retrieving the last known fuel level and time stamp in connection with the last known fuel level (e.g., input by a service technician using a mobile device 86 and stored in the customer systems database 102) and subtracting the amount of fuel that was consumed, as described above, during the time period beginning at the time of last known fuel level and extending to the current time. This information can be stored in the one or more of the databases 102 and 104 for later retrieval and use by the system 200. The analytics engine 96 can also predict when a fuel tank 24 at a customer location 80 will run out of fuel, or when the fuel level will reach a predetermined "low" threshold, based on the remaining amounts of fuel in the fuel tank 24 at one or more points in time and by applying heuristic algorithms, or the like, thereto, in order to determine the predicted rate of fuel consumption based on historical usage and trends. This information can also be stored in the one or more of the databases 102 and 104 for later retrieval and use by the system 200. The analytics engine 96 can also determine if there is a leak, blockage, or other problem condition, with one or more of the fuel system components (e.g., fuel tank 24, fuel pipe 22, valve 18, burner 20, etc.) at a customer location 80 based on sensor data received from the sensor database 104, such as the sensor 14 and data received from one or more flow sensors and/or pressure sensors positioned between the fuel system components, and by comparing the data from the sensor 14 and the one or more flow and/or pressure sensors to determine if fuel is properly flowing through all of the fuel system components. For example, if the analytics engine 96 determines that fuel is flowing through a sensor positioned in-line with the pipe 22, but the valve 18 is fully closed, the analytics engine can infer that there is a leak between the sensor and the valve 18 (e.g., in the pipe 22). Conversely, if the analytics engine 96 identifies a reduced flow rate through a sensor positioned in-line with the pipe 22, but the valve 18 is fully open, the analytics engine can infer that there is a leak between the sensor and the fuel tank 24 (e.g., in the pipe 22). The analytics engine 96 can also infer that there is leak, or other problem condition, with one or more of the components of the heating system if the analytics engine 96 determines that the valve 18 has been open for a duration of time that exceeds historical norms (e.g., by way of hysteresis examining historical data of the sensor 14 stored in the sensor database 104), indicating that an insufficient amount of fuel is being provided to the burner 20. The information related to the problem conditions can also be stored in the one or more of the databases 102 and 104 for later retrieval and use by the system 200.

The delivery optimization engine 98 can receive information from one or more of the databases 102 and 104, one or more systems of the system code 92, the fuel provider system 82, or other systems via the network 90 and can use said information to generate a delivery schedule and/or route that optimizes the delivery of fuel to one or more customer locations 80. For example, the optimization engine 98 can receive information from the fuel analytics engine 96 related to the fuel levels of tanks 24 at one or more customer locations 80, a date or time when each of the fuel tanks 24 is predicted to run out of fuel or reach a low-fuel threshold, can receive information from the customer system database 102 related to the physical location (e.g., address) and size of fuel tank 24 at each customer location 80, can receive information from the fuel provider system 82 or delivery truck 88 related to the fuel capacity of the delivery truck 88, and can receive information from a web-based mapping system (e.g., google maps). Accordingly, the optimization engine 98 can generate a delivery schedule for a delivery truck 88 that minimizes delivery times and fuel consumption of the truck 88, optimizes (e.g., maximizes) the amount of fuel that is delivered to each customer location (e.g., along a given route), and/or optimizes the total amount of fuel that is delivered before the truck 88 requires refueling. For example, the optimization engine 98 can generate a route that minimizes the distance traveled by the delivery truck 88 and maximizes the amount of fuel that the delivery truck can distribute before having to return to a fuel provider 82 for refueling.

The inventory engine 100 can receive information from one or more of the databases 102 and 104, one or more systems of the system code 92, the fuel provider system 82, or other systems via the network 90 and can use said information to generate refueling schedule for the fuel provider system 82. For example, the inventory information engine 100 can receive information (e.g., from the fuel analytics engine, database, 102, and/or database 104) related to the predicted times and dates when the tanks 24 at each of the customer locations 80 will require refueling and how much fuel will be required to fill each tank 24, can receive information from the fuel provider system 82 related to the capacity of one or more centralized fuel tanks and the available fuel in said tanks, and can generate and transmit a refueling schedule to the fuel provider system 82 to ensuring that the fuel provider system 82 will always have sufficient amounts of fuel to fill the fuel trucks 88 and thereby service the customer locations 80.

Figure 4:
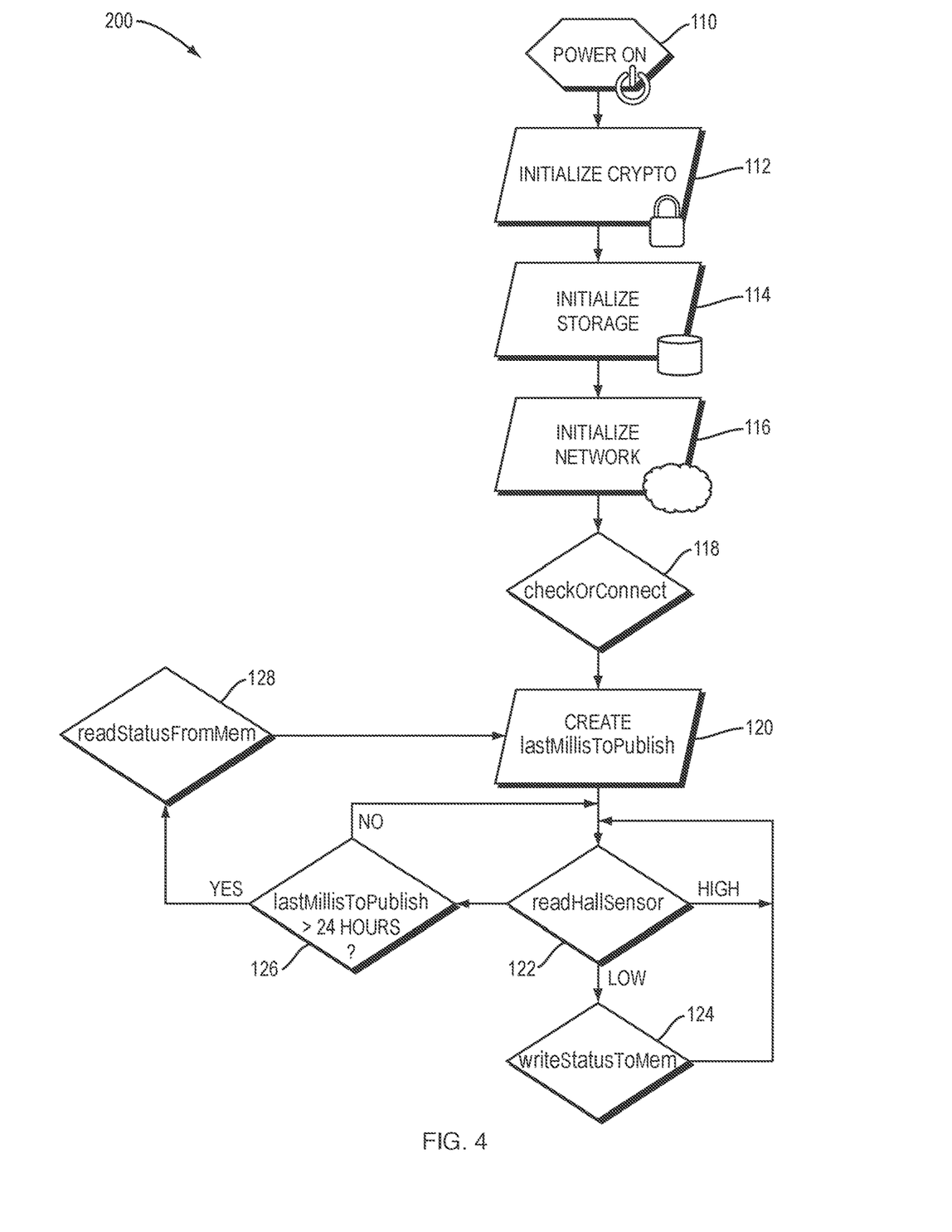
FIG. 4 is a flowchart illustrating process steps carried out by the fuel monitoring device of the present disclosure.

FIG. 4 is a flowchart illustrating overall processing steps carried out by system 200 for monitoring the operational status of a solenoid valve 18 by way of a fuel monitoring device 12. In step 110, the fuel monitoring device 12 receives power (e.g., via a power source and/or rechargeable battery as described in connection with FIG. 2). In step 112, the fuel monitoring device 12 initializes cryptography algorithms or other security systems, if any, for providing secure communication between the fuel monitoring device 12 and one or more other systems or devices of the system 200 via the network 90 (e.g., as discussed in connection with FIG. 3), or via direct communication (e.g., via Bluetooth). In step 114, the fuel monitoring device 12 initializes storage devices (e.g., non-volatile memory 40 of the communication system 16). In step 116, the fuel monitoring device 12 initializes one or more network communication protocols (e.g., obtains an IP address for a local Wi-Fi or LAN network). In step 118, the monitoring device 12 can execute a checkOrConnect command, whereby the monitoring device 12 connects to a network (e.g., network 90) and determines if a web-based server (e.g., analytics server 84) is available.

Figure 5:
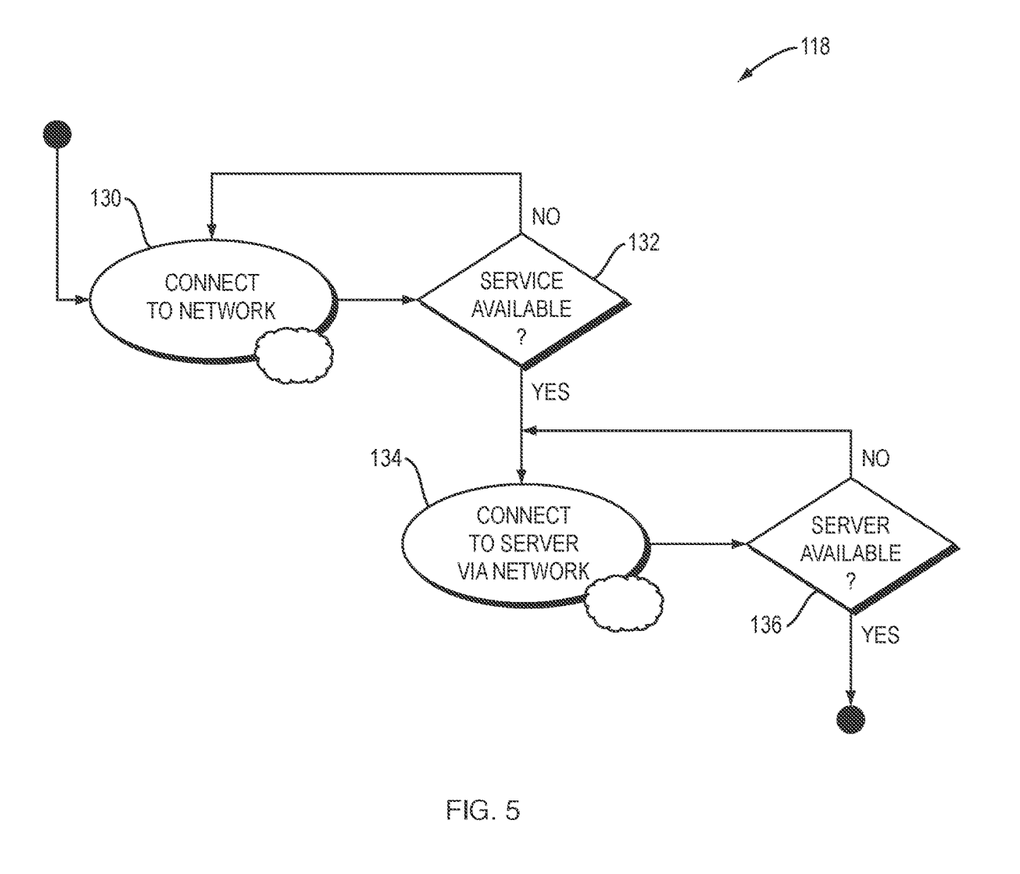
FIG. 5 is a flowchart illustrating process step 118 of FIG. 4 in greater detail.

FIG. 5 is a flowchart illustrating process step 118 of FIG. 4 in greater detail. In step 130, the monitoring device 112 attempts to connect to a network service. In step 132, the monitoring device 112 determines if the network is available. If a negative determination is made in step 132, the process returns to step 130 and another attempt to connect to the network is made. If a positive determination is made in step 132, a connection to the network is made and the process proceeds to step 134, where the monitoring device 12 attempts to connect to a web or cloud-based server (e.g., analytics server 84) via the network. In step 136, the monitoring device 112 determines if the server is available. If a negative determination is made in step 136, the process returns to step 134 and another attempt to connect to the server is made. If a positive determination is made in step 136, a connection to the server is made and the process proceeds to step 120, described in connection with FIG. 4.

Returning to FIG. 4, in step 120, the monitoring device 12 can execute a lastMillisToPublish command, whereby the monitoring device 12 creates a time stamp reflecting the last time the status of the Hall sensor was published to the server. In step 122, the monitoring device 12 can execute a read-HallSensor command, whereby the monitoring device 12 receives input from a Hall sensor (e.g., sensor 14) and determines the status thereof. If the monitoring device 12 determines that the output of the Hall sensor is high (e.g., the valve 18 is off) the process returns to step 122 and continues monitor the status of the Hall sensor.

Figure 6:
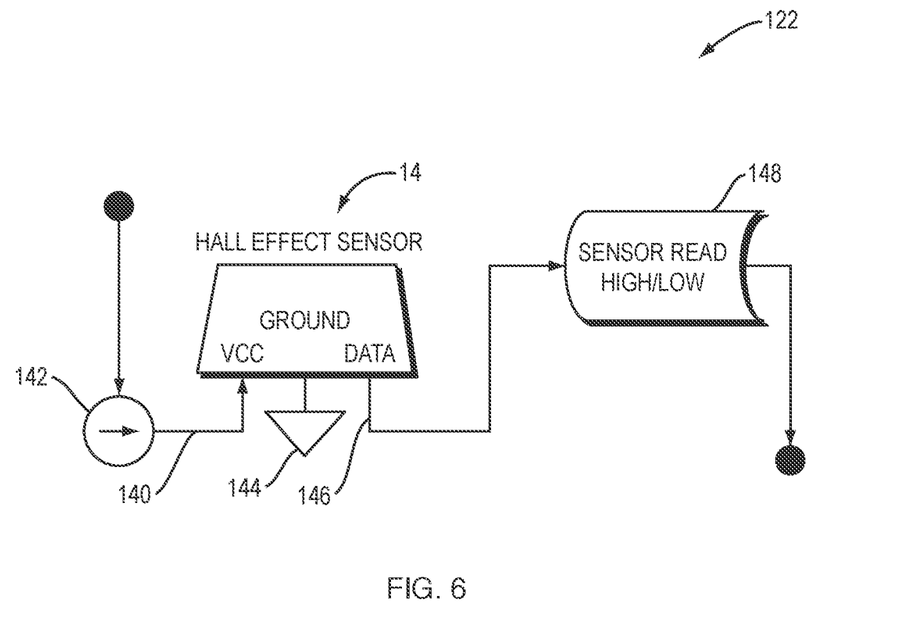
FIG. 6 is a diagram illustrating process step 122 of FIG. 4 in greater detail.

FIG. 6 is a diagram illustrating process step 122 of FIG. 4 in greater detail. As shown, a Hall sensor 14 includes a first pin 140 (e.g., "VCC") coupled to an input voltage 142 (e.g., +5-24V DC), a second pin 144 coupled to a ground connection (e.g., "GROUND"), and a third pin 146 (e.g., DATA), which the monitoring device 12 reads at 148 to determine if the output of the Hall sensor 14 is "high" or "low."

Figure 7:
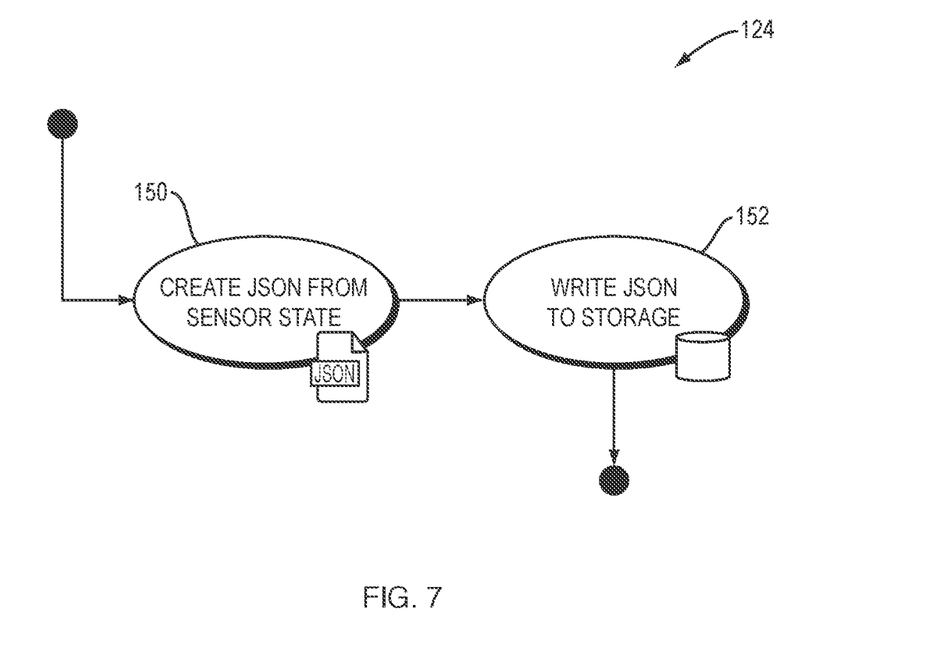
FIG. 7 is a flowchart illustrating process step 124 of FIG. 4 in greater detail.

With reference to FIG. 4, if the monitoring device 12 determines that the output of the Hall sensor is low (e.g., the solenoid valve 18 is on) in step 122, the process proceeds to step 124 and the monitoring device 12 can execute a writeStatusToMem command, whereby the monitoring device 12 records the "LOW" status of the Hall sensor to a memory (e.g., non-volatile memory 40, shown in FIG. 2) and then the process returns to step 122. FIG. 7 is a flowchart illustrating process step 124 of FIG. 4 in greater detail. In step 150, the monitoring device 12 creates a data file (e.g., a JavaScript Object Notation ("JSON")) with the sensor state data received from the Hall sensor, described in connection with step 122. In step 152, the data file is saved to storage (e.g., local non-volatile memory 40 of the monitoring device 12).

In step 126, the monitoring device 12 determines if the lastMillisToPublish command, executed in connection with step 120, returns a value that is greater that a predetermined amount of time, for example, 24 hours. If a negative determination is made, in step 126, the process returns to step 122 and continues to monitor the status of the Hall sensor 14. If a positive determination is made in step 126, the process proceeds to step 128 and the monitoring device 12 can execute a readStatusFromMem command, whereby the monitoring device 12 can open the data file containing the sensor state data obtained from the Hall sensor 14, and publish the data file to a remote web-based server (e.g., analytics server 84).

Figure 8:
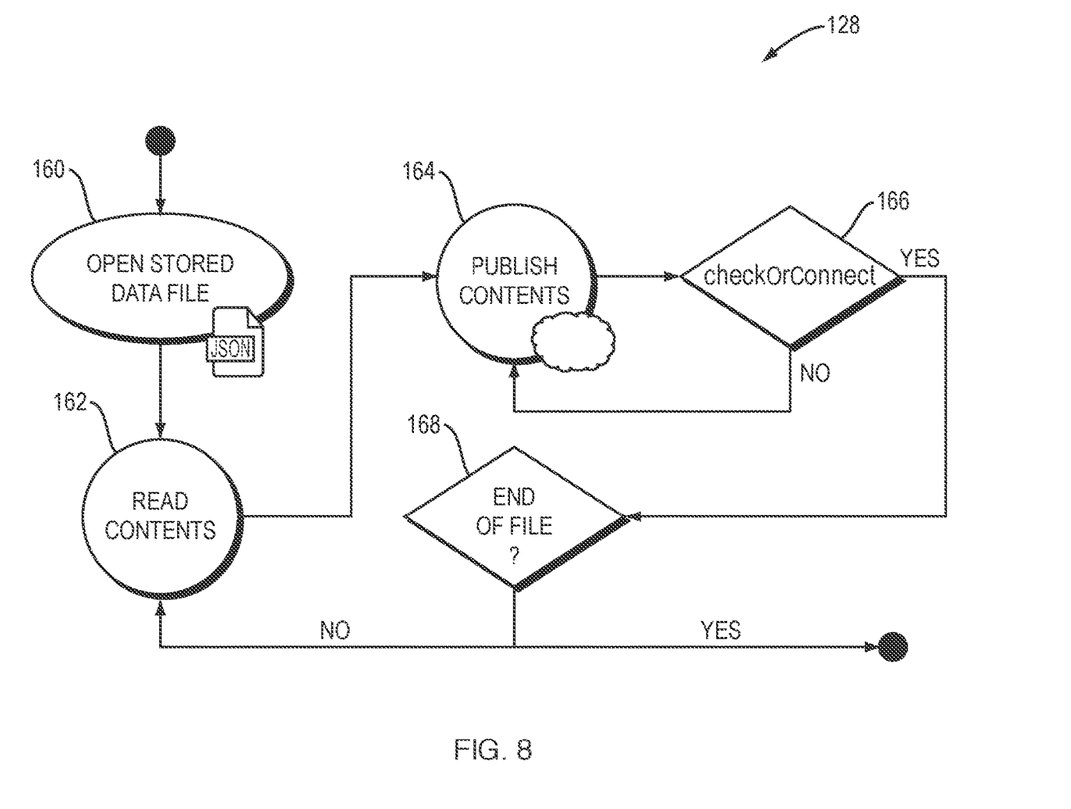
FIG. 8 is a flowchart illustrating process step 128 of FIG. 4 in greater detail.

FIG. 8 is a flowchart illustrating process step 128 of FIG. 4 in greater detail. In step 160 the monitoring device 160 can access the memory (e.g., non-volatile memory 40) and open the stored data file containing the sensor state data obtained from the Hall sensor 14. In step 162, the monitoring device 12 reads the contents of the data file, proceeds to step 164, and attempts to publish the contents of the file to the remote web-based server (e.g., analytics server 84). In step 166, the monitoring device 12 can execute the checkOrConnect command, described in connection with step 118, whereby the monitoring device 12 determines if the network and web-based server (e.g., server 84) are available. If a negative determination is made in step 166, the process reverts to step 164 and if a positive determination is made in step 166, the Hall sensor status data file is published to the server and the process proceeds to step 168, where the monitoring device 12 determines if the end of the data file has been reached. If a negative determination is made in step 168, the process reverts to step 162 and continues to read the contents of the data file. If a positive determination is made in step 168, the process continues and reverts to step 120, discussed in connection with FIG. 4. As such, the monitoring device 12 can execute the lastMillisToPublish command, thereby updating the time stamp to reflect the most recent publication of the Hall sensor status data file. Accordingly, the data file can be continuously published, or uploaded, to the remote web server at periodic intervals. The process steps described in connection with FIGS. 4-8 will continue to run, as the process loop shown in connection with FIG. 4, as long as power is provided to the monitoring device 12.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A system for monitoring a fuel tank, comprising:
a fuel monitoring device configured to monitor the status of a fuel tank, the fuel monitoring device including at least one sensor configured to monitor a position of a valve coupled to an output of the fuel tank and a communication system configured to establish communication between the fuel monitoring device and one or more remote computer systems via a communications network;
a remote server system in communication with the fuel monitoring device via the communications network, the remote server system having a processor configured to execute system code stored on a memory, the system code including a fuel analytics engine;
wherein the fuel monitoring device communicates data related to the position of the valve measured by the at least one sensor to the remote server system via the communications network;
wherein the remote server system receives the data related to the position of the valve, data related to the configuration of the valve, and data related to the configuration of the fuel tank and the fuel analytics engine determines the amount of fuel remaining in the fuel tank.

2. The system of claim 1, wherein the valve is a solenoid valve and the at least one sensor includes a Hall-effect sensor positioned adjacent to the solenoid valve and configured to monitor the position thereof.

3. The system of claim 1, wherein the fuel monitoring device and the remote server system communicate via the Internet.

4. The system of claim 1, wherein the fuel monitoring device comprises a memory and continuously stores the data related to the position of the valve on the memory and periodically establishes communication with the remote server system via the communications network and transmits the data related to the position of the valve thereto.

5. The system of claim 1, comprising a fuel provider system in communication with the remote server system, the remote server system communicating the amount of fuel remaining in the fuel tank to the fuel provider system.

6. The system of claim 1, wherein the remote server system includes a delivery optimization engine, the delivery optimization engine in communication with a fuel provider system and a delivery vehicle via the communications network, the delivery optimization engine configured to generate a route for the delivery vehicle that minimizes the amount of fuel consumed by the delivery vehicle.

7. The system of claim 1, comprising a mobile device configured to receive the data related to the configuration of the valve and the data related to the configuration of the fuel tank and communicate said data to the remote server system via the communications network.

8. The system of claim 1, wherein the data related to the configuration of the valve and the data related to the configuration of the fuel tank are stored in a customer database in communication with the remote server system.

9. The system of claim 1, wherein the fuel analytics engine receives data related to the last known fuel level of the fuel tank and determines when the fuel tank will require a fuel delivery.

10. The system of claim 8, wherein the fuel analytics engine is in communication with a delivery optimization engine, the delivery optimization engine generating a fuel delivery schedule based on the determination of the fuel analytics engine for when the fuel tank will require a fuel delivery.

11. A system for monitoring a fuel tank, comprising:
a fuel monitor having a magnetic field sensor, the sensor fixed proximate a solenoid fuel valve;
a communication system connected between the fuel monitor and one or more remote computer systems via a communications network;
a remote server system in communication with the fuel monitor via the communications network, the remote server system having a processor including a fuel analytics engine;
wherein the fuel monitor senses a magnetic field associated with an open solenoid fuel valve, calculates fuel consumption and communicates fuel consumption and related data to the remote server system via the communications network;
wherein the remote server system receives the data and determines the amount of fuel remaining in the fuel tank.

12. The system of claim 11, wherein the remote server system issues notices relating to fuel level and schedules fuel deliveries.

13. The system of claim 11, wherein the fuel monitor and the remote server system communicate via the Internet.

14. The system of claim 11, wherein the fuel monitor comprises a memory and continuously stores the fuel consumption and related data on the memory and periodically establishes communication with the remote server system via the communications system to transmit the fuel consumption and related data thereto.

15. The system of claim 11, comprising a fuel provider system in communication with the remote server system, the remote server system communicating the amount of fuel remaining in the fuel tank to the fuel provider system.

16. The system of claim 11, wherein the remote server system includes a delivery optimization engine, the delivery optimization engine in communication with a fuel provider system and a delivery vehicle via the communications network, the delivery optimization engine configured to generate a route for the delivery vehicle that minimizes the amount of fuel consumed by the delivery vehicle and that optimizes the amount of fuel delivered to one or more fuel tanks on the route.

17. The system of claim 11, comprising a mobile device configured to receive data related to the fuel valve and data related to the configuration of the fuel tank and communicate said data to the remote server system via the communications network.

18. The system of claim 11, wherein data related to the fuel valve and data related to the configuration of the fuel tank are stored in a customer database in communication with the remote server system.

19. The system of claim 11, wherein the fuel analytics engine receives data related to the last known fuel level of the fuel tank and determines when the fuel tank will require a fuel delivery.

20. The system of claim 19, wherein the fuel analytics engine is in communication with a delivery optimization engine, the delivery optimization engine generating a fuel delivery schedule based on the determination of the fuel analytics engine for when the fuel tank will require a fuel delivery.

21. A method for monitoring a fuel tank, comprising:
providing a fuel monitoring device configured to monitor the status of a fuel tank, the fuel monitoring device including at least one sensor configured to monitor a position of a valve coupled to an output of the fuel tank and a communication system configured to establish communication between the fuel monitoring device and one or more remote computer systems via a communications network;
positioning the at least one sensor of the fuel monitoring device proximate to the valve such that the at least one sensor can detect a magnetic field of the valve and determine the position of the valve;
transmitting data related to the position of the valve from the fuel monitoring device to a remote server system via the communications network, the remote server system having a processor configured to execute system code stored on a memory, the system code including a fuel analytics engine; and
receiving the data related to the position of the valve, data related to a configuration of the valve, and data related to the configuration of the fuel tank at the remote server system, the fuel analytics engine determining s the amount of fuel remaining in the fuel tank.

* * * * *

UNITED STATES PATENT AND TRADEMARK OFFICE
CERTIFICATE OF CORRECTION

PATENT NO. : 11,841,138 B2
APPLICATION NO. : 17/187952
DATED : December 12, 2023
INVENTOR(S) : Shotmeyer et al.

Page 1 of 1

It is certified that error appears in the above-identified patent and that said Letters Patent is hereby corrected as shown below:

In the Claims

In Column 12, Line 22, Claim 21, the letter "s" after the word "determining" should be deleted.

Signed and Sealed this
Ninth Day of April, 2024

Katherine Kelly Vidal
*Director of the United States Patent and Trademark Office*